(12) United States Patent
Fukami et al.

(10) Patent No.: US 8,381,547 B2
(45) Date of Patent: Feb. 26, 2013

(54) AIR-COOLING/TEMPERING APPARATUS FOR GLASS SHEET, AND AIR-COOLING/TEMPERING METHOD

(75) Inventors: Masao Fukami, Chiyoda-ku (JP); Shinya Ota, Chiyoda-ku (JP); Yutaka Kitajima, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/044,103

(22) Filed: Mar. 9, 2011

(65) Prior Publication Data

US 2011/0154862 A1    Jun. 30, 2011

Related U.S. Application Data

(63) Continuation of application No. PCT/JP2009/065738, filed on Sep. 9, 2009.

(30) Foreign Application Priority Data

Sep. 9, 2008   (JP) ................................. 2008-231039

(51) Int. Cl.
*C03B 27/044*   (2006.01)
(52) U.S. Cl. ........................................... 65/348; 65/114
(58) Field of Classification Search .................... 65/104, 65/111, 114, 348, 351, 254, 268, 370.1, 115
See application file for complete search history.

(56) References Cited

U.S. PATENT DOCUMENTS

| | | | | |
|---|---|---|---|---|
| 2,881,565 A | * | 4/1959 | White ............................... | 65/114 |
| 3,269,822 A | * | 8/1966 | Carson et al. .................... | 65/288 |
| 3,294,518 A | * | 12/1966 | Laseck et al. .................... | 65/348 |
| 3,353,946 A | * | 11/1967 | McMaseter ...................... | 65/348 |
| 3,396,000 A | * | 8/1968 | Carson et al. .................... | 65/104 |
| 3,799,752 A | * | 3/1974 | Cheron ............................. | 65/351 |
| 4,430,110 A | * | 2/1984 | Frank et al. ...................... | 65/104 |
| 4,444,579 A | * | 4/1984 | Dunn et al. ...................... | 65/351 |
| 4,483,701 A | * | 11/1984 | Kellar et al. ..................... | 65/106 |
| 4,483,702 A | * | 11/1984 | Frank et al. ...................... | 65/273 |
| 4,501,603 A | * | 2/1985 | Frank et al. ...................... | 65/106 |

(Continued)

FOREIGN PATENT DOCUMENTS

| | | |
|---|---|---|
| EP | 0 024 979 A1 | 3/1981 |
| JP | 48-17515 | 3/1973 |

(Continued)

OTHER PUBLICATIONS

International Search Report mailed Oct. 13, 2009 in PCT/JP2009/065738 filed Sep. 9, 2009.

(Continued)

*Primary Examiner* — Jason L. Lazorcik
(74) *Attorney, Agent, or Firm* — Oblon, Spivak, McClelland, Maier & Neustadt, L.L.P.

(57) ABSTRACT

An air-cooling/tempering apparatus and method, which can properly temper a glass sheet bent to have a complexly curved surface, without increasing the heating temperature of the glass sheet or increasing a wind pressure from air-blowing openings. A lower blowing member of the air-cooling/tempering apparatus includes a plurality of blade-shaped members arranged into a combtooth shape each having a front end face provided with a plurality of arranged air-blowing openings. Each blade-shaped member has a front end face with a concave curve so that a gap from the plurality of airblowing openings to the bent glass sheet becomes substantially uniform. The arrangement of air-blowing openings provided on the front end face of each blade-shaped member is turned with a predetermined angle and extends in one direction in each side portion in plan view.

8 Claims, 12 Drawing Sheets

U.S. PATENT DOCUMENTS

| | | | |
|---|---|---|---|
| 4,511,386 A * | 4/1985 | Kellar et al. | 65/273 |
| 4,511,387 A * | 4/1985 | Kellar et al. | 65/287 |
| 4,604,124 A * | 8/1986 | Strauss | 65/273 |
| 4,711,655 A * | 12/1987 | Schultz | 65/351 |
| 4,749,399 A * | 6/1988 | Yamada et al. | 65/273 |
| 4,816,058 A * | 3/1989 | Kuster et al. | 65/348 |
| 4,874,418 A * | 10/1989 | Kuster et al. | 65/348 |
| 5,045,102 A * | 9/1991 | Vanaschen et al. | 65/165 |
| 5,507,852 A * | 4/1996 | Frank et al. | 65/348 |
| 5,647,882 A * | 7/1997 | Thiessen | 65/348 |
| 5,735,923 A | 4/1998 | Hisaeda | |
| 5,917,107 A * | 6/1999 | Ducat et al. | 65/348 |
| 6,180,237 B1 | 1/2001 | Kato et al. | |
| 6,295,842 B1 * | 10/2001 | McMaster | 65/114 |
| 6,339,941 B1 * | 1/2002 | Bremer | 65/355 |
| 6,370,917 B1 * | 4/2002 | Kato et al. | 65/114 |
| 6,418,754 B1 * | 7/2002 | Nitschke et al. | 65/111 |
| 6,718,798 B2 * | 4/2004 | Nitschke et al. | 65/104 |
| 7,448,232 B2 * | 11/2008 | Jarvinen et al. | 65/348 |
| 8,028,543 B2 * | 10/2011 | Carlomagno | 65/348 |
| 2004/0055337 A1 | 3/2004 | Nemugaki | |
| 2004/0216489 A1 * | 11/2004 | Maeda et al. | 65/114 |
| 2006/0191292 A1 * | 8/2006 | Carlomagno | 65/114 |
| 2011/0016921 A1 | 1/2011 | Yoda et al. | |

FOREIGN PATENT DOCUMENTS

| | | |
|---|---|---|
| JP | 11-199257 | 7/1999 |
| JP | 2000-281370 | 10/2000 |
| JP | 2006-521274 | 9/2006 |
| WO | WO 2004/085326 A1 | 10/2004 |

OTHER PUBLICATIONS

U.S. Appl. No. 08/282,432, filed Jul. 29, 1994, Hisaeda.
The Extended European Search Report issued Jun. 12, 2012, in Application No. 09813086.7-1218 / 2351713 PCT/JP2009065738.

* cited by examiner

BACKGROUND ART

AIR-COOLING/TEMPERING APPARATUS FOR GLASS SHEET, AND AIR-COOLING/TEMPERING METHOD

TECHNICAL FIELD

The present invention relates to an air-cooling/tempering apparatus and an air-cooling/tempering method, particularly to an air-cooling/tempering apparatus for blowing air to both surfaces of a curved glass sheet bent and in a state of high temperature to air-cool/temper the glass sheet, and to such an air-cooling/tempering method.

BACKGROUND ART

There has been known a method of heating a glass sheet to a temperature close to a softening point in a heating apparatus, forming the glass sheet by a forming mold or by own weight of the glass sheet, and quenching the glass sheet in an air-cooling/tempering apparatus to produce an automotive window glass sheet. Such an air-cooling/tempering apparatus is constituted by a plurality of upper nozzle chambers provided on an upper blowing member and a plurality of lower nozzle chambers provided on a lower blowing member, and the apparatus is configured to blow an air against an upper surface of a bent glass sheet from air-blowing openings of the plurality of upper nozzle chambers, and to blow an air against a lower surface of the glass sheet from air-blowing openings of the plurality of lower nozzle chambers, to air-cool/temper the glass sheet.

An air-cooling/tempering apparatus disclosed in JP-A-2006-521274 (hereinafter referred to as Patent Document 1) has, as shown in FIG. 7, an upper blowing member (blowing head) 1 and a lower blowing member (blowing head) 2 disposed above and below a glass sheet to quench the glass sheet, and these blowing members 1, 2 are each constituted by a plurality of blade-shaped members (plenums) 3, 3 . . . arranged with a gap from one another into a comb-tooth shape, and on a front face of each of these blade-shaped members 3, 3 . . . , a plurality of air-blowing openings 4, 4 . . . are formed so as to be dotted. These air-blowing openings 4, 4 . . . are formed so as to be inclined from one another on the front end face of each blade-shaped member 3 to obtain a divergent flow of air. However, since the blade-shaped member 3 linearly extends in a direction perpendicular to a conveying direction of a glass sheet G indicated by an arrow A in FIG. 8, the plurality of air-blowing openings 4, 4 . . . dotted on the front end face of each blade-shaped member 3 are linearly arranged in plan view. Further, the arrangement of the air-blowing openings 4, 4 . . . extends along a line of the blade-shaped member 3 curved in its extending direction, and the curvature of the arrangement is determined so as to conform to an average local curvature of the bent glass sheet G. Namely, in the air-cooling/tempering apparatus of Patent Document 1, the blade-shaped members 3, 3 . . . are constructed so that the distance from the plurality of air-blowing openings 4, 4 . . . to the bent glass sheet G is substantially uniform.

DISCLOSURE OF INVENTION

Technical Problem

However, in the air-cooling/tempering apparatus of Patent Document 1, the arrangement of the plurality of air-blowing openings 4, 4 . . . is linear in plan view, and the arrangement has a curvature only in one direction. Accordingly, there is a demerit that although the apparatus can satisfactorily temper a single-curved glass sheet curved only in one direction, the apparatus cannot satisfactorily temper a complexly curved glass sheet G curved in two directions as shown in FIG. 9.

FIG. 9(A) is a perspective view of the glass sheet G, wherein the curved surface is drawn by a broken line so as to facilitate understanding, FIG. 9(B) is a cross-sectional view along a line A-A (hereinafter referred to as "single curve direction") of FIG. 9(A), and FIG. 9(C) is a cross-sectional view along a line B-B (hereinafter referred to as "complex curve direction") of FIG. 9(A). As understandable from FIGS. 9(B) and (C), the glass sheet G is curved in two directions that are the single curve direction and the complex curve direction.

In a case of cooling a complexly curved glass sheet by an air-cooling/tempering apparatus such as one described in Patent Document 1 wherein air-blowing openings are linearly arranged as shown in FIG. 8, it is possible to dispose the air-blowing openings so that the axes of the air-blowing openings are perpendicular to the glass sheet surface along the arrangement direction of the air-blowing openings, but it is not possible to make the axes of the air-blowing openings perpendicular to the glass sheet surface in a direction perpendicular to the arrangement direction of the air-blowing openings. This is because it is necessary to provide a run up distance to blow the air against the glass sheet with a desired wind speed, and considering the distance between adjacent air-blowing openings, it has not been possible to incline the axis of each air-blowing opening in a direction perpendicular to the arrangement direction of the air-blowing openings.

Provided that the cooling performance when the air is blown perpendicularly to a glass surface is "1", the cooling performance when the air is blown at an angle of 45° to the glass surface is said to be "0.5". In other words, as the blowing angle of air to the glass surface becomes smaller, the cooling performance becomes smaller and the possibility of generation of insufficient tempering becomes high. Namely, it is known that a cooling performance for a complexly curved glass sheet is lower than that for a simple curved glass sheet.

Here, the term "tempering" means to form a residual compressive stress layer on a surface and a residual tensile stress layer inside a glass sheet in the thickness direction. A glass sheet that is not properly tempered is handled as a defective product since the residual compressive stress on its surface is too low to satisfy a required strength, and since the residual tensile stress inside is too low to satisfy a criteria of the number of particles in a fragmentation test.

In order to solve the above problems of insufficient tempering, heretofore, glass sheets have been produced under narrow conditions satisfying the above criteria by rising the heating temperature of a glass sheet in a heating furnace, rising a wind pressure from air-blowing openings or shortening the distance from the air-blowing openings to the glass sheet. Here, when the heating temperature of the glass sheet is raised, there occurs a problem that since the glass sheet becomes easily bendable, control of the bent shape becomes difficult. Further, when the wind pressure from the air-blowing openings is raised or the distance from the air-blowing openings to the glass sheet is decreased, there is a problem that strain of the glass sheet tends to occur.

The present invention has been made under the circumstances, and it is an object of the present invention to provide an air-cooling/tempering apparatus for a glass sheet, which can properly temper a bent glass sheet having a complexly curved surface without increasing the heating temperature of the glass sheet or increasing the wind pressure of air-blowing openings, and to provide such an air-cooling/tempering method.

Solution to Problem

In order to achieve the above objects, the present invention provides an air-cooling/tempering apparatus for a glass sheet, comprising an upper blowing member for blowing a cooling air against an upper surface of a glass sheet bent and in a state of high temperature, and a lower blowing member for blowing a cooling air against a lower surface of the glass sheet; the upper blowing member and the lower blowing member each having a plurality of nozzle chambers each provided with a plurality of air-blowing openings facing to the glass sheet; wherein each of the plurality of nozzle chambers has a portion where the air-blowing openings are arranged along a first direction and a portion where the air-blowing nozzles are arranged along a second direction so that the arrangement turns from the first direction in plan view.

In the present invention, the arrangement of a plurality of air-blowing openings provided on a face of each nozzle chamber facing to a glass sheet, extends in a first direction and turns into a second direction in plan view. In such a construction, it becomes possible to make axes of air-blowing openings arranged along the second direction, to be substantially perpendicular to a glass sheet surface even if the glass sheet is a complexly curved glass sheet.

Some type of automotive window glasses are deeply curved along a first direction. Particularly, there is an window glass having both side ends curved into angle close to 90° from a horizontal plane when the window glass is disposed horizontally. Further, in a case of complexly curved glass sheet, such a glass sheet is curved from its horizontal plane also along a direction perpendicular to the first direction. Particularly, in a case of a glass sheet shown in FIG. 9 having both side portions curved upwardly in plan view, both side portions of the upper end line of the glass sheet are more deeply curved from a horizontal plane along a direction perpendicular to the first direction than the center portion of the upper end line. Namely, the upper end portion of the glass sheet is curved more deeply than the lower end portion, and for example, when the glass sheet is attached to an automobile body, both side portions of the upper end portion are deeply curved toward car-interior side to cover the inside of the automobile. In this case, in a conventional air-cooling/tempering apparatus, even if axes of air blowing openings are perpendicular to a surface of the glass sheet along the first direction, the axes of the air-blowing openings are at angles remarkably deviating from a direction perpendicular to the surface of the glass sheet along a direction perpendicular to the first direction.

In the present invention, the axes of the air-blowing openings are substantially perpendicular to a surface of the glass sheet along the second direction. Along the first direction, there is a portion where the axes of the air blowing openings slightly deviate from a perpendicular direction to a surface of the glass sheet, but it becomes possible to make the axes of the air-blowing openings close to perpendicular to the surface of the glass sheet. For example, at a point, the angle of the axis of air-blowing opening along the first direction changes from 90° to 80° but the angle along a direction perpendicular to the second direction changes from 45° to 80°. Namely, in a direction perpendicular to the first direction, the angle to the surface of the glass sheet improves from 45° to 80°, whereby the cooling performance is improved.

Accordingly, without increasing the heating temperature of a glass sheet or increasing the wind pressure from air-blowing openings, it is possible to properly temper a bent complexly curved glass sheet.

Further, it is preferred that each of the nozzle chambers is a blade-shaped member, each of the upper blowing member and the lower blowing member has a plurality of such nozzle chambers arranged in parallel with one another with a predetermined gap, and each blade-shaped member has a portion extending in the first direction and a portion extending in the second direction in plan view.

In the present invention, by constituting a nozzle chamber by a plurality of blade-shaped members disposed in parallel, it is possible to obtain flow paths of air from a wind chamber to air-blowing openings and to tidy air flow in each flow path, whereby it becomes possible to convey air to the air-blowing openings with low pressure drop. Further, when a cooling breakage occurs in air-cooling/tempering, glass cullets formed by the breakage can be easily discharged (dropped) through gaps between the blade-shaped members of the lower blowing member, such being preferred.

Further, it is preferred that each of the nozzle chambers is provided with a guide flow path for guiding air to each air-blowing opening, and the guide flow path is formed so that the axis of the guide flow path is perpendicular to a surface of a glass sheet to be air-cooled/tempered.

In the present invention, guide flow paths to guide air to the air-blowing openings are formed so that their axis are perpendicular to a surface of a glass sheet to be air-cooled/tempered, whereby air flow tidied by such a guide flow path is blown with small pressure drop to reach the surface of the glass sheet. Accordingly, it is possible to reduce the pressure drop at each air-blowing opening and to prevent lowering of cooling performance.

Further, the length of the guide flow path is preferably at least 100 mm.

In the present invention, by providing a guide flow path having a length of at least 100 mm that is sufficient for tidying flow of air supplied from a wind chamber, it is possible to reduce the pressure drop at each air blowing opening and to prevent lowering of cooling performance.

Further, it is preferred that each nozzle chamber has a plurality of cylindrical nozzles arranged linearly, each of the upper blowing member and the lower blowing member has a plurality of the nozzle chambers arranged in parallel with one another with a predetermined gap, and each nozzle chamber has a portion where the plurality of cylindrical nozzles are arranged along the first direction and a portion wherein the cylindrical nozzles are arranged along the second direction in plan view.

In the present invention, even in a nozzle chamber constituted by a plurality of cylindrical nozzles, the plurality of cylindrical nozzles are arranged so that its arrangement extends in a first direction and turns to a second direction, whereby it is possible to make the axis of each cylindrical nozzle substantially perpendicular to a glass sheet surface of a complexly curved glass sheet, such being preferred.

Further, it is preferred that the arrangement of the air-blowing openings turns from the first direction to the second direction at an air-blowing opening blowing the cooling air against a portion of the glass sheet to be air-cooled/tempered where an upper end line or a lower end line of the glass sheet extending sideways from the central portion deeply curves upwardly or downwardly.

In a case of a complexly curved glass sheet, particularly for the reason of design of an automotive window glass, as described above, the upper end line or the lower end line of the glass sheet extending sideways from the center deeply curves upwardly or downwardly, and the upper portions of the glass sheet outside such deeply curved portions cover a car-interior side in many cases. In such a case, the axis of each air-blowing opening significantly deviates from a perpendicular direction to the glass sheet along a direction perpendicular to the first direction. Accordingly, in the present invention, by turning the arrangement of air-blowing openings into the second direction in such portions, it is possible to follow the bent shape of the glass sheet and to properly temper such a complexly curved glass sheet.

Further, it is preferred that the arrangement of the air-blowing openings turns from the first direction to a third direction at an air-blowing opening blowing the cooling air against the vicinity of a portion of the glass sheet to be air-cooling tempered where the upper end line or the lower end line of the glass sheet extending sideways from the central portion deeply curves upwardly or downwardly, that is a portion different from the portion defined in preceding construction where the upper end line or the lower end line of the glass sheet extending sideways from the central portion deeply curves upwardly or downwardly.

For example, in a case where the arrangement of air-blowing openings extends in a row along the first direction and the arrangement further extends along the second direction from an end of the row along the first, the arrangement of the air-blowing openings may be turned into a third direction at the other end of the row of air-blowing openings along the first direction, that is, a portion where the upper end line or the lower end line of a glass sheet extending sideways from the center deeply curves upwardly or downwardly. Thus, by turning the arrangement of the air-blowing openings into the third direction, even if the glass sheet has a shape whose upper end line or the lower end line extending sideways from the center deeply curves upwardly or downwardly at both sides of the center, it is possible to follow the curved shape of the glass sheet and to properly temper such a complexly curved glass sheet.

Further, it is preferred that the air-blowing openings outside the turning point are linearly arranged toward the end. For example, by arranging the arrangement of the air-blowing openings only along a single direction, that is the second direction, toward the end portion from a portion of the glass sheet where the upper end line or the lower end line extending sideways from the center deeply curves upwardly or downwardly, then, the interval of air-blowing nozzles of adjacent nozzle chambers becomes constant, whereby it is possible to uniformly temper the entire glass sheet without having unevenness.

In order to achieve the above object, the present invention provides an air-cooling/tempering method for a glass sheet, comprising heating a glass sheet to a predetermined temperature by a heating furnace, forming the heated glass sheet by a forming means and air-cooling/tempering the bent glass sheet by the air-cooling/tempering apparatus of the present invention.

In the present invention, it is possible to properly temper a complexly curved glass sheet without increasing the heating temperature of the glass sheet or increasing the wind pressure from the air-blowing openings.

ADVANTAGEOUS EFFECTS OF INVENTION

In the present invention, by configuring the arrangement of a plurality of air-blowing openings provided on a face of each nozzle chamber facing to a glass sheet, so as to extend in a first direction and turn to a second direction in plan view, and thereby arranging the air-blowing openings so as to conform to a curved shape of the glass sheet, it is possible to properly blow air against the glass sheet and, to increase the cooling efficiency. Accordingly, it is possible to properly temper a bent complexly curved glass sheet without increasing the heating temperature of the glass sheet or increasing the wind pressure from the air-blowing openings.

DESCRIPTION OF EMBODIMENTS

Now, preferred embodiments of the air-cooling/tempering apparatus for a glass sheet and the air-cooling/tempering method according to the present invention will be described with reference to attached drawings.

Figure 1:
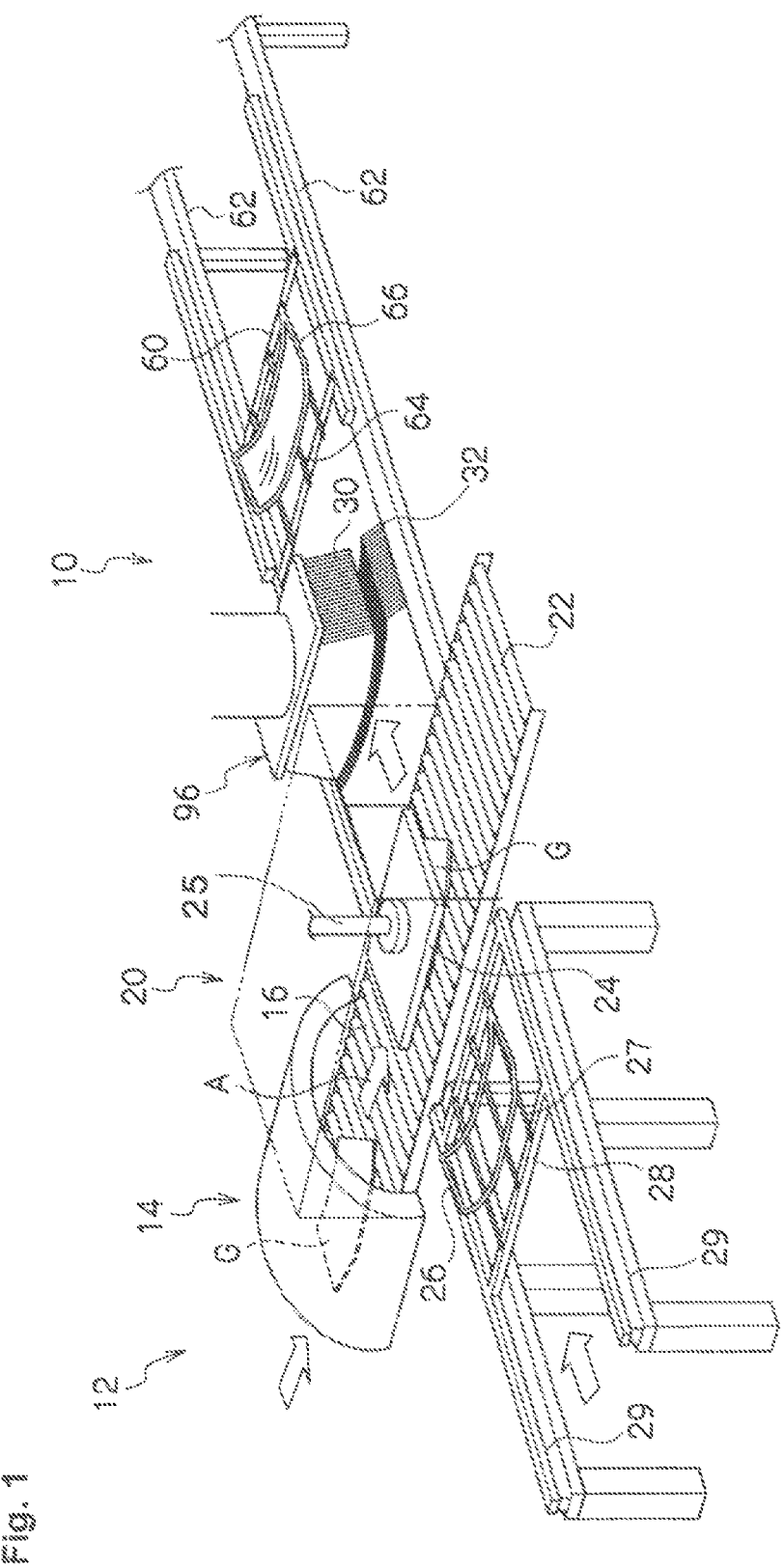
FIG. 1 is a perspective view showing the structure of a forming apparatus for glass sheet provided with an air-cooling/tempering apparatus of this embodiment.

FIG. 1 is a perspective view showing the entire structure of a glass sheet forming apparatus 12 including an air-cooling/tempering apparatus 10 for a glass sheet of this embodiment and this glass sheet forming apparatus 12 is a forming apparatus for an automotive rear glass. Here, the glass sheet forming apparatus 12 shown in the Figure is an in-furnace forming apparatus for forming a glass sheet G inside a heating unit 14, but the present invention is applicable to an out-furnace forming apparatus for forming a glass sheet G outside the heating unit 14. Further, the glass sheet G to be bent is not limited to an automotive rear glass, but it may be a front glass or a side glass, and the glass sheet G is not limited to an automotive glass.

In the heating unit 14, a roller conveyer 16 is disposed. A glass sheet G to be form is conveyed in a direction of an arrow A in the Figure in the heating unit 14 by the roller conveyer 16, and the glass sheet G is heated to a predetermined forming temperature while it is conveyed in the heating unit 14.

At an exit of the heating unit 14, a forming unit 20 is disposed, and the inside of the forming furnace communicates with the heating unit 14 and thus is maintained to be a high temperature state. The glass sheet G heated to the forming temperature in the heating unit 14 is conveyed into the forming unit 20 by a roller conveyer 22.

In the forming unit 20, a forming mold 24 is disposed. The forming mold 24 is suspended by four suspending rods (not shown) from a ceiling of the forming unit 20 so as to be disposed in the forming unit 20. A lower surface of the forming mold 24 is formed into a forming surface having a shape substantially agree with a bent shape of a glass sheet to be formed.

Here, "substantially" has the following meaning. Namely, a glass sheet right after forming is still in a high temperature state, and its central portion may flex down by gravity. Further, in a cooling step after the forming, the forming shape of the glass sheet may slightly change due to shrinkage from the shape at the forming time. The shape of the forming surface of the forming mold 24 may differ from the forming shape of glass sheet to be formed, by such expected slight change amount. The term "substantially" is used considering such change.

Further, the forming mold 24 is moved up and down in the vertical direction by an elevating means that is not shown. Further, to the upper portion of the forming mold 24, a suction pipe 25 is connected. This suction pipe 25 is connected to a suction apparatus (not shown). Here, on a forming surface of the forming mold 24, a large number of suction openings (not shown) are formed, and by suctioning air through the suction openings, the glass sheet G is suctioned and held to the forming surface.

Further, at a position under the forming mold 24, a lift jet (not shown) is disposed under the roller conveyer 22. This lift jet blows hot air against the glass sheet G conveyed to a position above the lift jet by the roller conveyer 22. The glass sheet G floats up from the roller conveyer 22 by receiving this hot wind, and the floating glass sheet G is suctioned to the forming surface of the forming mold 24, and pressed between the forming surface and a forming ring 26, to be bent into a predetermined curved shape.

This bending ring 26 has a peripheral shape of a glass sheet substantially agreeing with the bent shape of the curved glass sheet G to be formed, and the bending ring 26 is mounted on a bending ring-supporting frame 27. The bending ring-supporting frame 27 is mounted on a bending shuttle 28, and the bending shuttle 28 is driven by a driving mechanism (not shown) and shuttles on rails 29. By an operation of the bending shuttle 28, the bending ring 26 shuttles between the forming position in the forming unit 20 and a standby position outside the forming furnace.

Meanwhile, in an air-cooling/tempering apparatus 10, a quench shuttle 60 is provided. The quench shuttle 60 is disposed at a position opposite from the bending shuttle 28 across the forming unit 20, the quench shuttle 60 is driven by a driving mechanism (not shown) and shuttles on rails 62. On the quench shuttle 60, a quench ring 66 is provided via a quench ring-supporting frame 64.

The quench ring 66 is configured to receive the glass sheet G bent in the forming unit 20, and has a peripheral shape of glass sheet substantially agreeing with the bent shape of a curved glass sheet to be formed. By an operation of the quench shuttle 60, the quench ring 66 shuttles between a receiving position in the forming unit 20 and an air-cooling/tempering position outside the forming furnace. Namely, when the bending ring 26 returns to a standby position on sideways, a door on the other side of the forming unit 20 opens, and the quench shuttle 60 moves from the outside of the furnace to a position under the forming unit 20. Then, by releasing suction of the glass sheet G to the forming mold 24, the glass sheet G bent by the forming mold 24 is transferred onto the quench ring 66 and the glass sheet G is conveyed by the quench shuttle 60 to the air-cooling/tempering apparatus 10. Here, the glass sheet G air-cooled/tempered by the air-cooling/tempering apparatus 10 is transferred by the quench shuttle 60 to a subsequent step.

Figure 9:
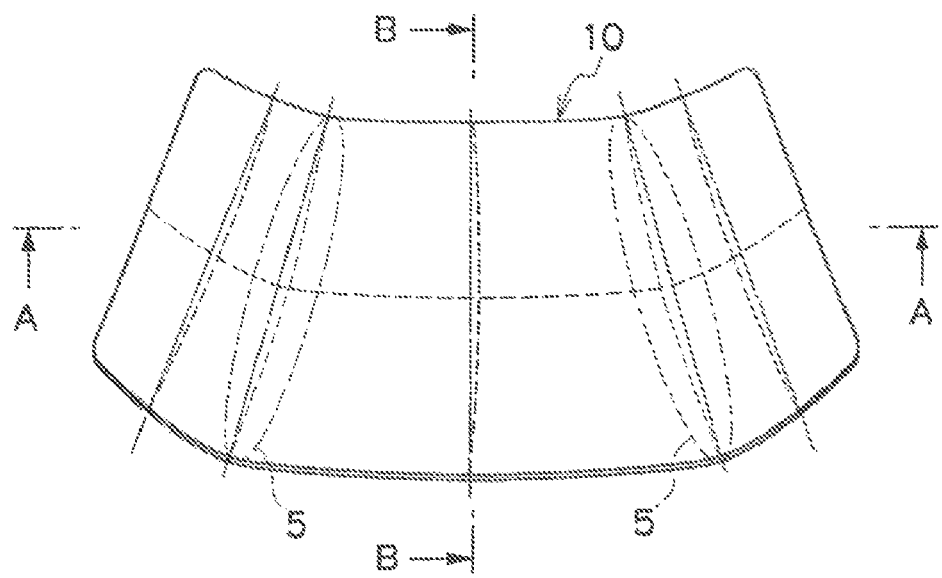
FIG. 9 is a view for explaining a curved glass sheet having a complexly curved surface.
Figure 9:
Figure 9:

FIG. 9 is an explanation view of the glass sheet G formed by the forming mold 24.

By the forming, this glass sheet G is formed into a shape corresponding to a predetermined rear glass shape curving both in a single curve direction (left-right direction in FIG. 9, that is, a first direction) and a complex curve direction (vertical direction in FIG. 9, that is, a direction perpendicular to the first direction) In the example of FIG. 9, the external shape of the glass sheet G has a shape elongated sideways, and has portions 5, 5 where the glass sheet deeply curves upwardly. Accordingly, side portions of the upper end line or the lower end line are higher than the central portion of the upper end line or the lower end line. Since the glass has a shape elongated sideways, along the single curve direction, the glass sheet is deeply curved from a horizontal surface in side portions when the glass sheet is placed horizontally. Along the complex curve direction, the glass sheet is formed with substantially the same curvature in all portions, but since the glass sheet G has an external shape of the example of FIG. 9, side portions of the upper end line is deeply curved from a horizontal plane when the glass sheet is placed horizontally.

Here, the present invention is not limited to the shape of glass sheet shown in FIG. 9, and the present invention is effective for a shape wherein the curvature along the complex curve direction increases toward side portions, such as a shape wherein the curve of the upper end line of a glass sheet is deeper than the curve of its lower end line so that the upper end portion curves to cover side end portions. In an extreme case, the present invention is effective for a shape produced by sharply folding side portions of a rectangular glass sheet along oblique lines.

The glass sheet G to which bending is completed, is conveyed by the quench ring 66 to the air-cooling/tempering apparatus 10 of this embodiment as described above. This air-cooling/tempering apparatus 10 has an upper blowing member 30 and a lower blowing member 32 disposed above and under an air-cooling/tempering area 28 shown in FIG. 2.

Figure 2:
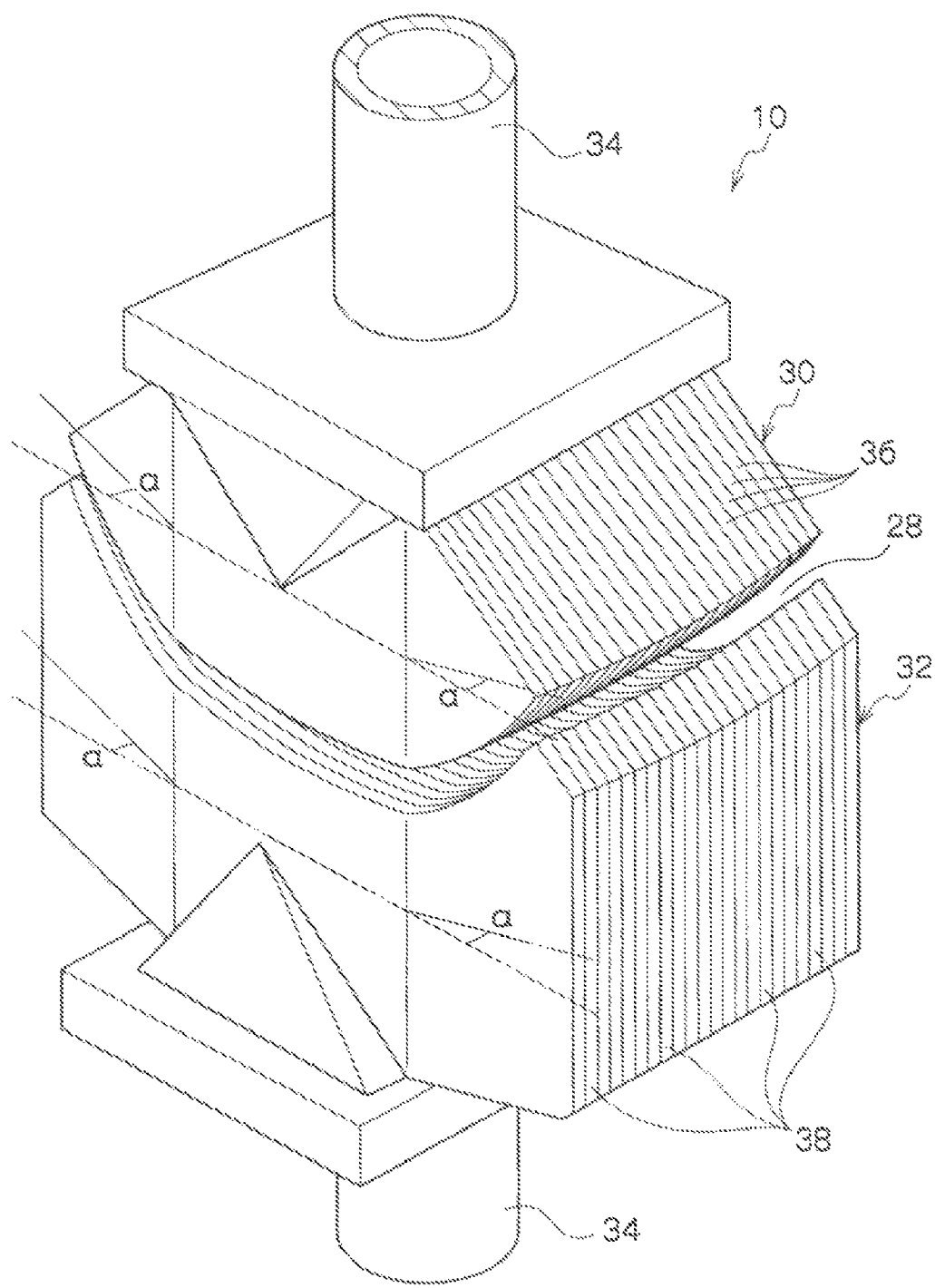
FIG. 2 is a perspective view showing an external appearance of an air-cooling/tempering apparatus of this embodiment.

To the upper blowing member 30 and the lower blowing member 32, respective ducts 34 are connected, and to these ducts 34, blowers, not shown, are connected. Accordingly, when these blowers are driven, air generated by the blowers is supplied through the respective ducts to the upper blowing member 30 and the lower blowing member 32. Then, as shown in FIG. 2, air is blown from a large number of air-blowing openings formed on front end faces (lower surfaces in FIG. 2) of a plurality of blade-shaped members (nozzle chambers) 36, 36 . . . constituting the upper blowing member 30, and from a large number of air-blowing openings 40, 40 . . . shown in FIGS. 3 and 4 formed on front end faces (upper surfaces in FIG. 2) of a plurality of blade-shaped members (nozzle chambers) 38, 38 . . . constituting the lower blowing member 32, toward the air-cooling/tempering area 28 shown in FIG. 2. By this operation, both surfaces of the glass sheet G supported by the quench ring 66 are cooled to be air-cooled/tempered.

The glass sheet G air-cooled/tempered by the air-cooling/tempering apparatus 10 is conveyed by movement of the quench shuttle 60 to an inspection step that is not shown. Here, the glass sheet G is inspected with respect to presence or absence of defect such as a crack. If there is no defect, the glass sheet G is conveyed to good product steps, and if a defect is found, the glass sheet G is conveyed to a defective product steps.

Next, characteristics of the air-cooling/tempering apparatus 10 of this embodiment will be described using the structure of the lower blowing member 32 as an example. Here, since the structure of the upper blowing member 30 is substantially equal to a vertically reversed structure of the lower blowing member 32, in this specification, the characteristics of the lower blowing member 32 are explained and explanation of the structure of the upper blowing member 30 is omitted.

Figure 3:
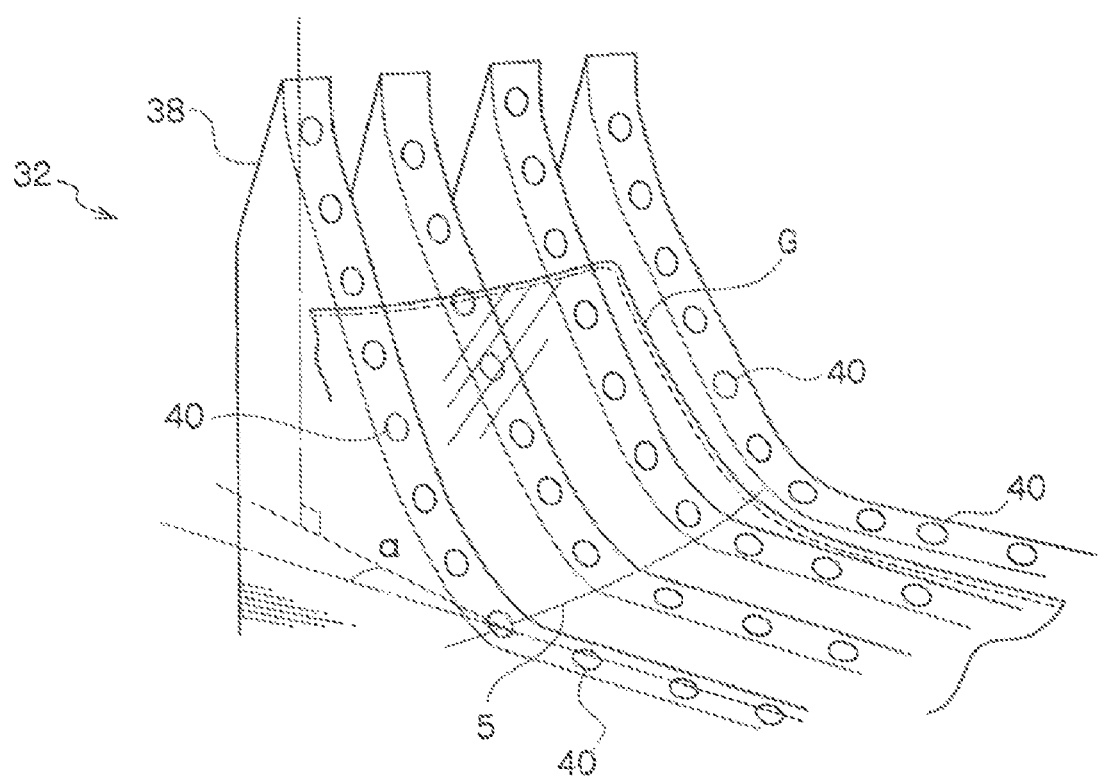
FIG. 3 is a perspective view showing the structure of a lower blowing member.
Figure 4:
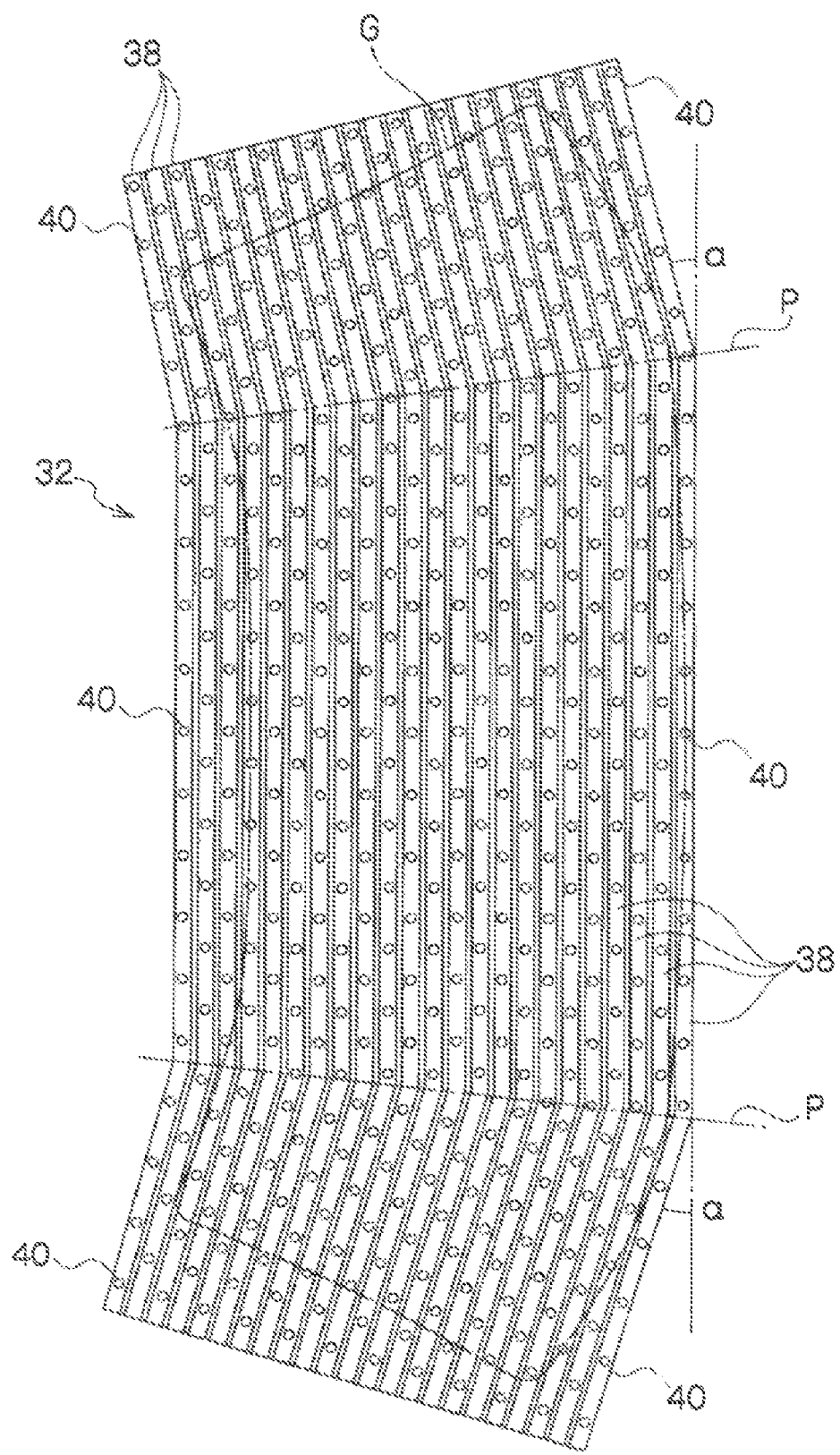
FIG. 4 is a plan view of a blade-shaped member whose both side portions are each turned at a predetermined angle and each extends linearly.

The lower blowing member 32 is, as shown in FIGS. 3 and 4, constituted by a plurality of blade-shaped members 38, 38 . . . arranged in a comb-tooth shape and each having a front end face provided with a large number of air-blowing openings 40, 40 . . . .

Further, the front end face of each of these blade-shaped members 38, 38 . . . has a concavely curved shape so that the gap from the plurality of air-blowing openings 40, 40 . . . to the bent glass sheet G is substantially uniform.

Then, the directions of both side portions of each of the plurality of blade-shaped members 38, 38 . . . are turned to respective predetermined angle directions (one direction is a second direction and another direction is a third direction). Specifically, as shown in FIG. 2, in a horizontal direction, the directions of both side portions are turned with an angle α. Namely, as shown in a plan view, the directions of both side portions of the arrangement of the plurality of air-blowing openings 40, 40 . . . provided on the front end face of each of the blade-shaped members 38, 38 . . . are turned to predetermined angle directions (one direction is the second direction and another direction is the third direction) with respect to the first direction. Specifically, in FIG. 4, the arrangement of air-blowing openings 40, 40 . . . in both side portions outside border line segments P are turned with an angle α with respect to the first direction. In this case, in a glass sheet G having a left-right symmetric shape, the angles α of the second direction and the third direction become the same. Accordingly, the directions of both side portions of each of the plurality of blade-shaped members 38, 38 . . . each curving upwardly, are turned to directions different from the first direction in plan view.

The air-blowing openings 40, 40 . . . in both side portions of the glass sheet G outside the turning points of the arrangement direction are formed along the shape of the glass sheet G toward end portions of each of the blade-shaped members 38, 38 . . . , so that axes of the air-blowing openings 40, 40 . . . are substantially perpendicular to a surface of the glass sheet G.

As shown in FIG. 3, arrangement of a plurality of air-blowing openings 40, 40 . . . cooling a central portion of a glass sheet, that is the direction of each of the blade-shaped members 38, 38 . . . , rises up toward side portions in front view and turns with an angle of α in plan view at an air-blowing opening for cooling a curving portion 5 where the upper end line of the external shape of the glass sheet extending sideways from the center deeply curves upwardly.

Accordingly, air-blowing openings 40, 40 . . . on both side portions of each of the blade-shaped members 38, 38 . . . are formed along the second direction and/or the third direction, and the axes of the air-blowing openings 40, 40 . . . are formed so as to be substantially perpendicular to a surface of the glass sheet G, whereby axes of the air-blowing openings 40, 40 . . . become at angles close to perpendicular to a surface of the glass sheet G in the complex curve direction although the angle to the surface of the glass sheet G does not become perpendicular in some portions in the single curve direction. Namely, in the complex curve direction, the angle of the axis of each air blowing opening to a surface of the glass sheet G is improved to be an angle close to right angle, whereby the cooling performance improves.

Accordingly, by the air-cooling/tempering apparatus 10 of this embodiment, it is possible to properly temper a glass sheet G bent and having a complexly curved plane 5 without increasing the heating temperature of the glass sheet G or increasing the wind pressure from the air-blowing openings 40.

Further, in the air-cooling/tempering apparatus 10 of this embodiment, since a nozzle chamber is constituted by a plurality of blade-shaped members 38, 38 . . . arranged in parallel, it is possible to obtain flow paths from a wind chamber to air-blowing openings 40, 40 . . . to tidy an air flow in each flow path, thereby to convey air to the air-blowing openings 40, 40 . . . with reduced pressure drop. Further, when a cooling breakage occurs during air-cooling/tempering, it is easily possible to discharge (drop) the glass cullets through gaps between the blade-shaped members.

Further, as shown in FIG. 4, deviation of the axis of air-blowing opening from perpendicular direction to a surface of a glass sheet G increases toward end portions from a portion where the upper end line of the external shape of the glass sheet G to be air-cooling tempered extending sideways from the center deeply curves upwardly. Accordingly, by the air-cooling/tempering apparatus 10 of this embodiment, by turning the arrangement direction of the air-blowing openings at this portion, it is possible to conform the arrangement to the bent shape of the glass sheet G and to properly temper the complexly curved glass sheet.

Furthermore, in the air-cooling/tempering apparatus 10 of this embodiment, as shown in FIGS. 3 and 4, the arrangement of the air-blowing openings 40, 40 . . . is turned to a single direction, the interval between air-blowing openings 40, 40 . . . of adjacent blade-shaped members 38, 38 . . . becomes constant. Accordingly, it is possible to temper the entire glass sheet uniformly without having unevenness. On the other hand, for example, when the direction of each blade-shaped member is turned into two directions (V shape) toward the ends at border line segments P, the interval between air-blowing openings 40, 40 . . . of two blade-shaped members 38, 38 located at a portion where the arrangement direction of the air-blowing openings 40, 40 . . . changes, becomes wider than that of other portions, and accordingly, it is not possible to uniformly temper the entire glass sheet without unevenness, such being not preferred.

Figure 5:
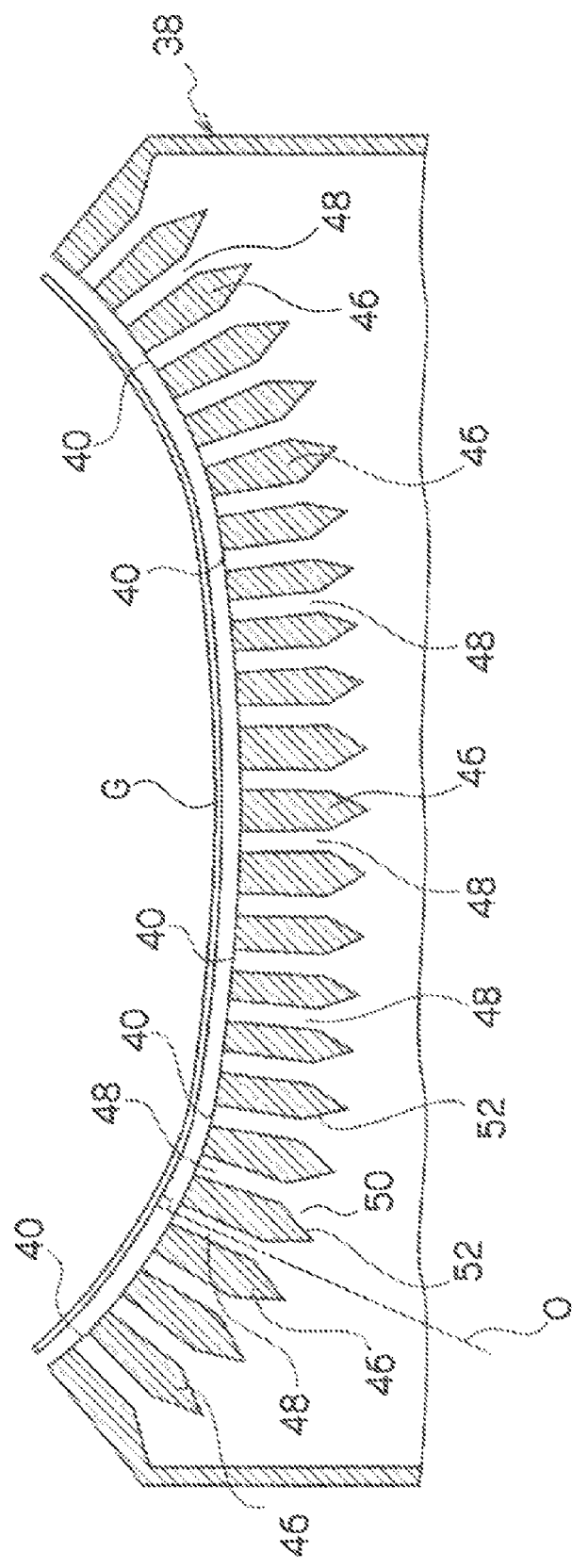
FIG. 5 is a cross-sectional view of the blade-shaped member.

Meanwhile, the air-blowing openings 40, 40 . . . of each blade-shaped member 38 are formed by arranging a plurality of nozzle blocks 46, 46 . . . with gaps between them as shown in FIG. 5. Namely, between nozzle blocks 46, 46 . . . , guide flow paths 48, 48 . . . for guiding air to air-blowing openings 40, 40 . . . , are formed, and each guide flow path 48 is formed so that its axis 0 is perpendicular to a surface of a glass sheet G to be air-cooled/tempered.

In this construction, since air blown from the air-blowing openings 40, 40 . . . blows perpendicularly against a surface of the glass sheet G, whereby it is possible to ideally temper a complexly curved glass sheet.

Further, each nozzle block 46 is formed to have guide faces 52, 52 that are inclined to narrow the cross-section of opening 50 from the blade-shaped member 38 side toward each guide flow path 48.

With this construction, since air is smoothly guided along the guide faces 52, 52 through each guide flow path 48 to each air-blowing opening 40, it is possible to reduce a pressure drop at each air-blowing opening 40 to increase cooling efficiency thereby to improve tempering function of a glass sheet G.

The length of the guide flow path 48 is preferably at least 100 mm. Namely, since guide flow paths 48 each having a length of at least 100 mm that is sufficient for forming a flow of air supplied from a wind chamber, are provided, it is possible to reduce the pressure drop at air-blowing openings 40, 40 . . . , to prevent lowering of cooling performance.

Figure 10:
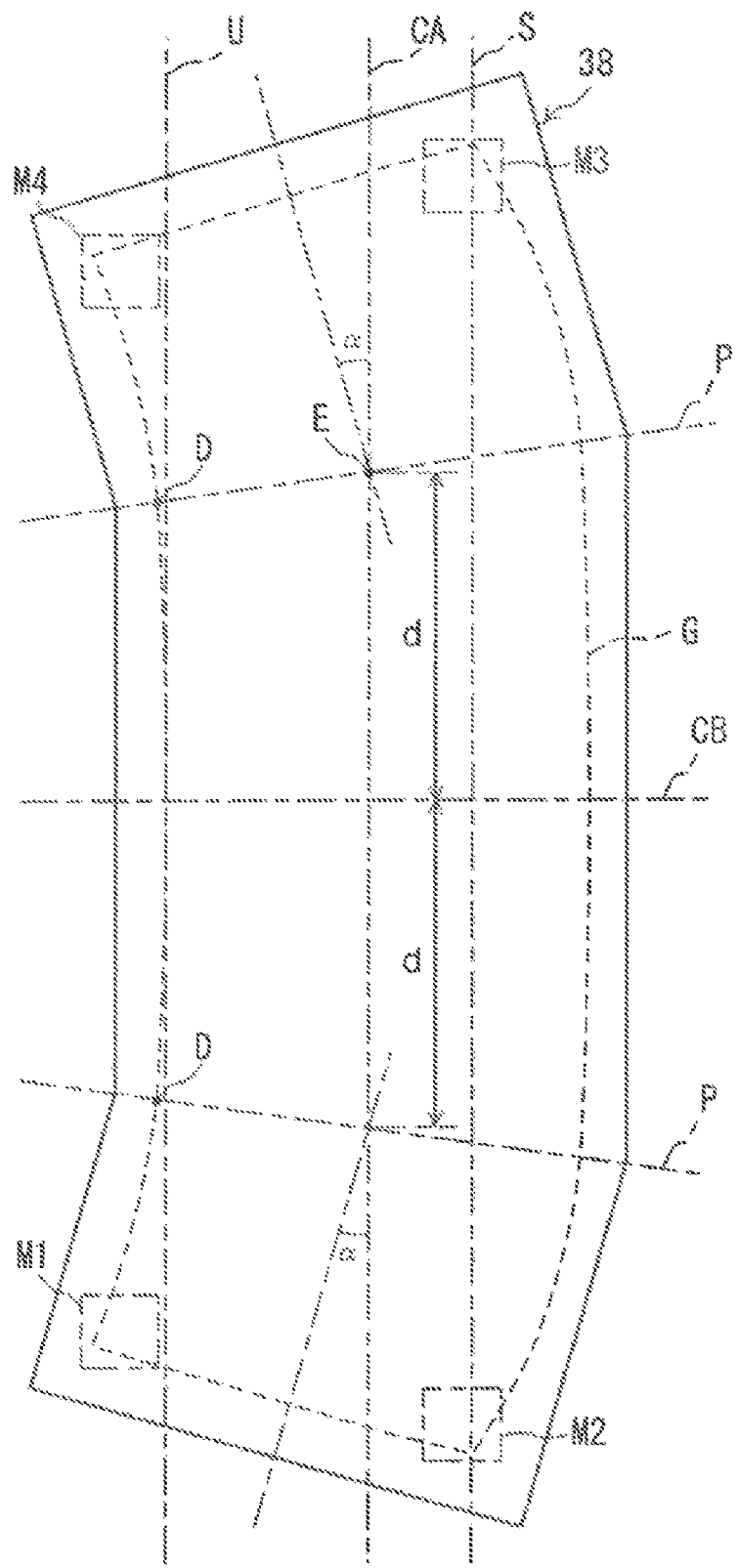
FIG. 10 is an explanation view of a method for deciding a turning angle of the blade-shaped member.

Next, a method for deciding the turning angle α and the turning point of turning the direction of the blade shaped member 38 in order to optimize the cooling performance, will be descried with reference to FIG. 10. This is a method for selecting the angle α and the turning point so that the axis of each air-blowing opening determined by the turning angle α of the blade-shaped member 38 becomes perpendicular or at an angle close to perpendicular to the glass surface. In FIG. 10, a broken line indicates the shape of glass sheet (B) to be air-cooled/tempered in plan view. The blade-shaped member 38 indicates the outline of all blade-shaped members 38.

First, a center line CA passing through the center of a glass sheet G and extending in left-right direction (vertical direction in the Figure) is imaginarily drawn, and a point E where a blade-shaped member 38 along the center line CA turns from the first direction to the second direction and/or to a third direction is imaginarily drawn. Then, an angle α of turning the direction of the blade-shaped member 38 is changed with e.g. 1° pitch, a distance d from the point E to the center of the glass sheet G is changed by e.g. 10 mm pitch, and under each combination of these conditions, an angle between a normal line to a surface of the glass sheet and the axis of each air-blowing opening is obtained.

(1) A curved line where a surface of the blade-shaped member 38 along its extending direction intersects the glass sheet G is obtained, and a normal line (blade side normal line) on this curved line is obtained.

(2) A normal line (glass side normal line) to a surface of the glass sheet G at a point corresponding to a point where the blade side normal line is obtained, is obtained.

(3) An angle between the blade side normal line and the glass side normal line (the angle between the axis of an air-blowing opening and the normal line to glass surface) is obtained.

(4) Under the same condition, the angle is obtained with respect to a region of a surface of the glass sheet to be calculated in the same manner as above, to obtain the maximum value of the angle in the region.

In the above procedure, a Table of the maximum value of the angle between the normal line of glass surface and the axis of air-blowing opening under every combination of the angle α and the distance d, is produced. From this Table, a combination of the angle α and the distance d whereby the maximum value of the angle between the normal line to the glass surface and the axis of air-blowing opening is minimized, is determined. By carrying out these calculations by a computer, the optimum angle α and distance B can be obtained in a short time.

A line segment P at which the directions of the blade-shaped members 38 turn, is obtained from the turning angle α and the turning point E of the blade-shaped members 38 so that intervals between adjacent blade-shaped members 38 become equal.

Here, this calculation method is effective for a case of turning the direction of the blade-shaped member 38 with a turning angle α of at least 5°, in a case of automotive rear glass, and more preferably, this calculation method is effective with a turning angle α of at least 10°.

Further, the turning point may be determined according to the shape of a glass sheet G. In a case of a glass sheet G indicated by the broken line in FIG. 10 wherein the upper end line is more deeply curved than the lower end line, a cross-section of the glass sheet G along a straight line extending in left-right direction (vertical direction in the Figure) between both side ends of an upper end portion, that is a cross-section along the upper end base line U in FIG. 10, is compared with a corresponding cross-section in a lower end portion, that is a cross-section along a line S passing through two corners of lower end in FIG. 10. Since the curve of the cross-section of the upper end portion is larger than the curve of the cross-section in the lower end portion when the glass sheet G is placed horizontally, the distance between these two cross sections increases from the center of the glass sheet G toward side ends. A point in the upper end portion of a point where the distance starts to increase is determined as a turning point. The reference of increase of the distance between two cross sections is determined according to the size of the glass sheet G, but in a case of an automotive rear glass, the reference is preferably set to be at least 5 mm.

Further, the turning point may be determined according to the external shape of the glass sheet in plan view. Explanation will be made with respect to a case of a glass sheet G indicated by the broken line having a left-right symmetrical shape wherein the upper end line and the lower end line curves upwardly in side portions.

A center line CB passing through the center of the glass sheet G and extending in the vertical direction (left-right direction in the Figure), and an upper end reference line U intersecting perpendicularly the center line CB and intersecting the upper end of the glass sheet G, are imaginarily drawn. The upper end line of the glass sheet G leaves from the upper end reference line U from the center line CB toward side ends (upward or downward in the Figure). The point where the distance increases is determined as a turning point D. The reference of increase of the distance is preferably set to be at least 6 mm in a case of an automotive rear glass.

Further, the turning angle of the blade-shaped member 38 may be determined according to the external shape of the glass sheet G in plan view. An explanation will be made with respect to a case of a glass sheet G indicated by the broken line in FIG. 10 having a left-right symmetrical shape wherein the upper end and the lower end of the glass sheet G is curved upwardly in side portions.

First, a turning point of the blade-shaped member 38 is determined. For example, in a case of a turning point D, the upper end line deeply curves so as to leave from the upper end reference line U from the turning point D toward side end (vertical direction in the Figure) of the glass sheet, and reaches a corner portion of the glass sheet where the upper end line meets a side end line. A line connecting the corner and the point D is imaginarily drawn, and the angle of the line to the upper reference line U is determined as a turning angle α of the blade-shaped member 38. As an alternative, the turning angle is set to be an angle close to the above angle.

By deciding the angle α or the turning point according to the external shape of the glass sheet G in plan view, it is possible to efficiently cool a complexly curved shape without increasing the number of blade-shaped members 38 from the number of the blade-shaped members 38 in the central portion of the glass sheet G.

Figure 11:
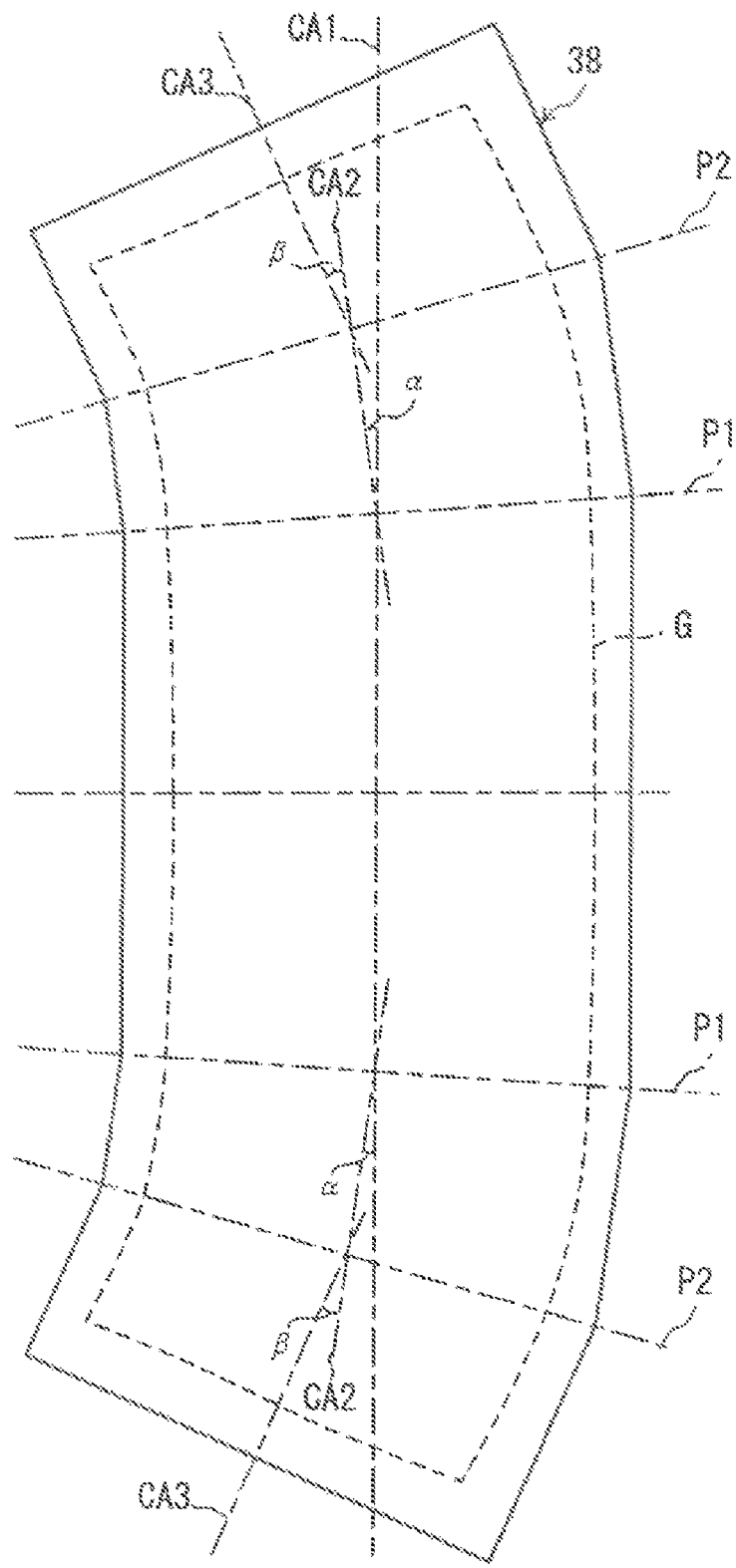
FIG. 11 is an explanation view of a method for deciding a turning angle of the blade-shaped member.

Further, as shown in FIG. 11, the direction of the blade-shaped member 38 may be turned from a first direction to a second direction or/and third direction, and further turned to a fourth direction or/and a fifth direction. The direction of the blade-shaped member 38 extends along a center line CA1 passing through a center in the vertical direction, turns at a line segment P1 with an angle of α to second and third directions, and extends in a direction in parallel with a line CA2. Further, the direction of the blade-shaped member 38 turns at a line segment P2 with an angle of β to fourth and fifth directions, and the blade-shaped member 38 further extends in a direction in parallel with a line CA3. In FIG. 11, two-stage turning is made at P1 and P2, but at least three-stage turning may be made.

Figure 6:
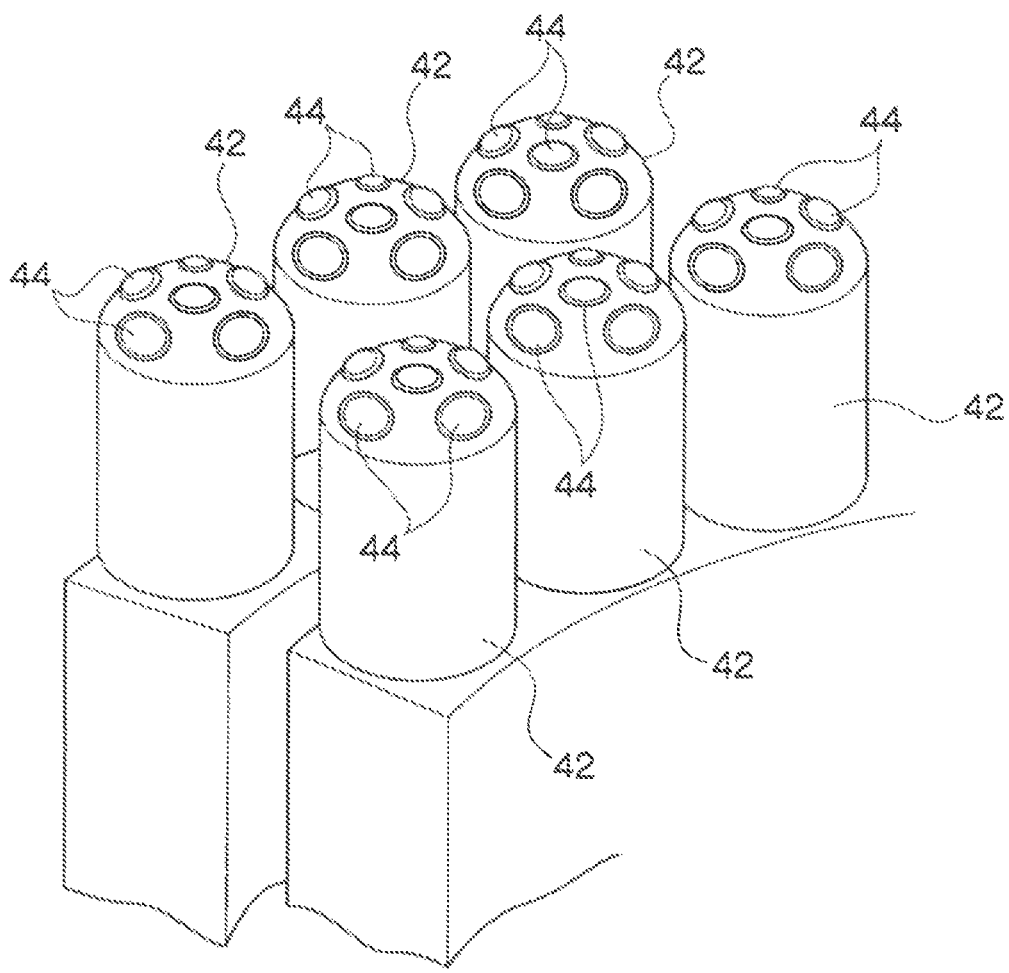
FIG. 6 is a perspective view showing a substantial part of a nozzle chamber having a cylindrical nozzle structure.

Here, instead of the blade-shaped member 38 of this embodiment, a nozzle chamber may be constituted by arranging a large number of cylindrical nozzles 42, 42 shown in FIG. 6 that is described in JP-A-11-199257. On a front end face of such a cylindrical nozzle 42, a plurality of air-blowing openings 44, 44 . . . are formed, and when a glass sheet is air-cooled/tempered by the cylindrical nozzle 42, it is possible to form a special stress pattern in the glass sheet. The arrangement of these cylindrical nozzles 42, 42 . . . is turned at a certain point toward the end in a plan view. (For example, when a glass sheet shown in FIG. 4 is to be air-cooled/tempered, the direction of the arrangement is turned at a line segment P with a predetermined angle into a second direction on one side and into a third direction on the other side. In this construction, like the arrangement of air-blowing openings 40, 40 . . . shown in FIGS. 3 and 4, the axes of cylindrical nozzles 42 become substantially perpendicular to a surface of the glass sheet, and it becomes possible to form a desired special stress pattern in a complexly curved glass sheet.

Further, even with a nozzle chamber constituted by such a plurality of cylindrical nozzles 42, 42 . . . , by turning the arrangement of the plurality of cylindrical nozzles 42, 42 . . . , it is possible to make axes of cylindrical nozzles 42 perpendicular to a surface of a glass sheet G even if the glass sheet G is a complexly curved glass sheet.

EXAMPLES

Figure 7:
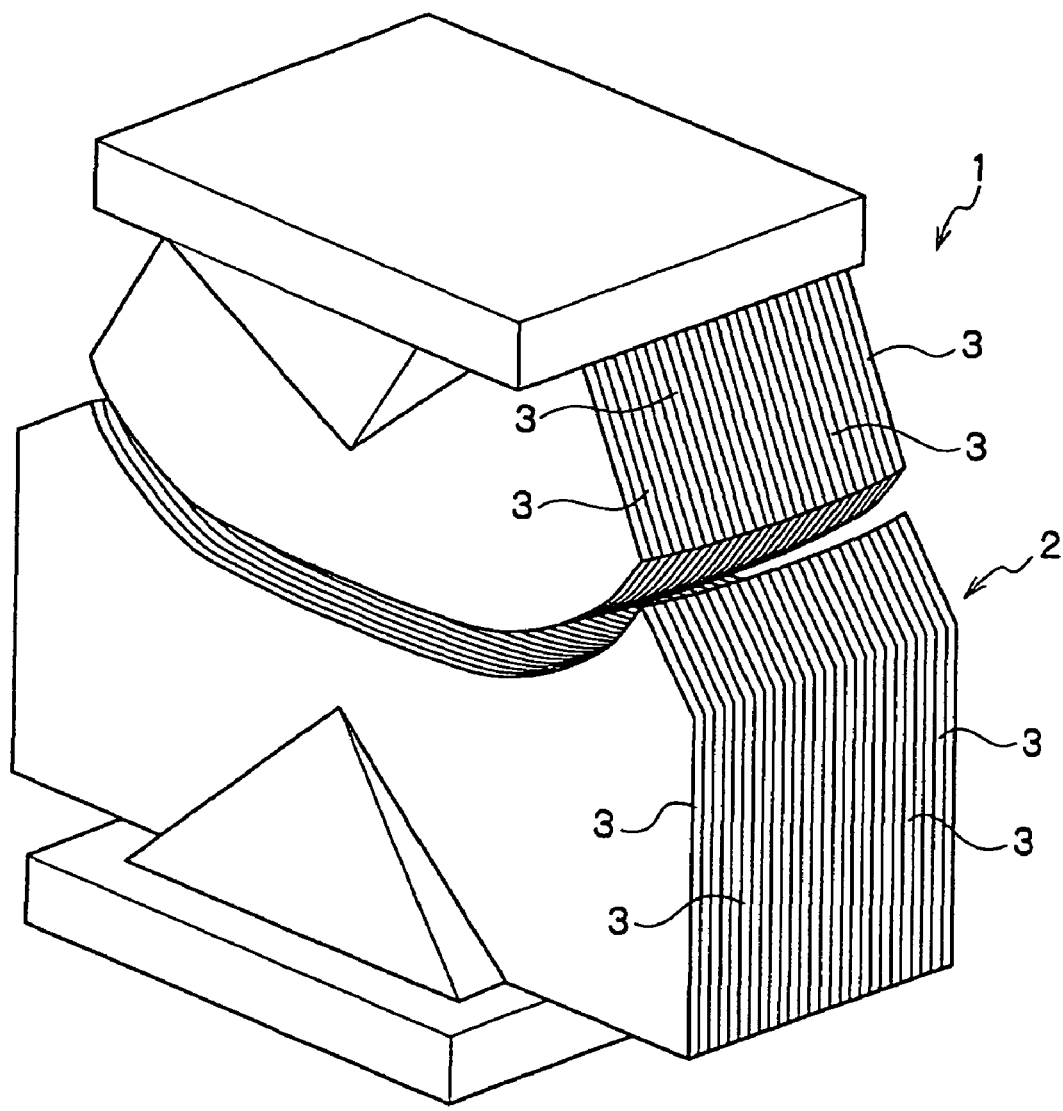
FIG. 7 is a perspective view showing an external appearance of a conventional air-cooling/tempering apparatus.
Figure 8:
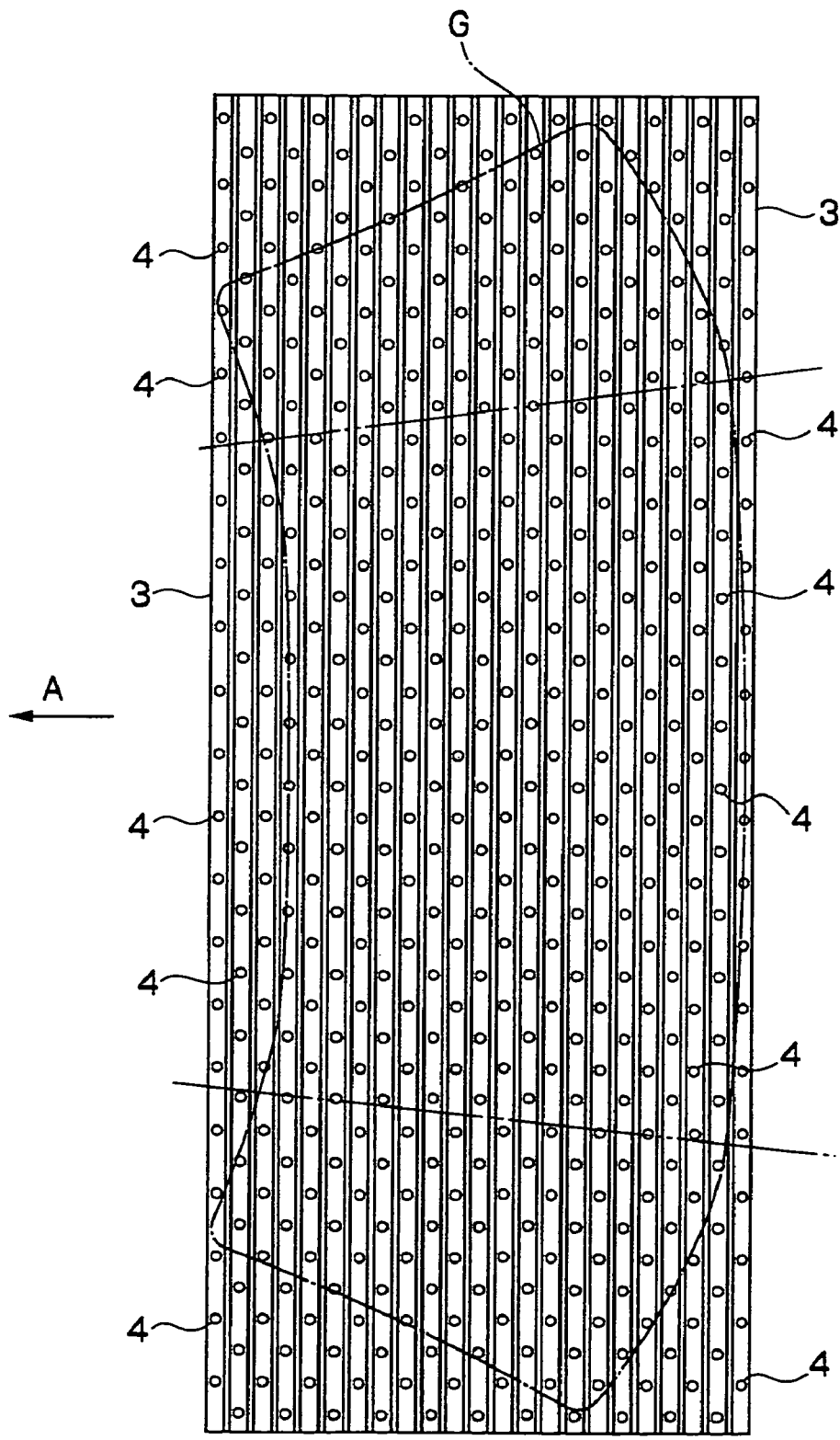
FIG. 8 is a plan view showing an arrangement of air-blowing openings of a conventional air-cooling/tempering apparatus.

A glass sheet was heated to 660 to 680° C., the glass sheet was shaped by a press-molding into a shape shown in FIGS. 9 and 10 (broken lines), it was air-cooled/tempered by the cooling apparatus (Examples) of the present invention shown in FIGS. 2, 4 and 10 or a conventional cooling apparatus (Comparative Example) shown in FIGS. 7 and 8, and a pulverization test was carried out to check whether it was properly tempered. In Example and Comparative Example, the test was carried out under the same conditions except for the cooling apparatus.

The glass sheet is a complexly curve to automotive rear glass having an external shape indicated by a broke line shown in FIG. 10 and having curvatures both in left-right direction and vertical direction shown in FIG. 9. The key dimensions of the glass sheet are as follows.

lateral length (vertical direction in FIG. 10): 1593 mm
    vertical length (left-right direction in FIG. 10): 591 mm
    vertical depth in the center (depth in the center in left-right direction shown in FIG. 9(C)): 12.2 mm
    vertical depth of side end line (depth of side end line with respect to left-right shown in FIG. 9(C)): 15.8 mm With this glass sheet, setting of the cooling apparatus was made in the following procedure.

The turning angle α of the blade-shaped member 38 was changed by 2° step and the distance d between the center of the glass sheet G and the turning point E was changed by 50 mm step according to the explanation of FIG. 10, and the maximum value of the angle of the axis of air-blowing opening to a surface of the glass sheet was obtained. Table 1 shows the result at angles α of 4° interval (unit is "°").

TABLE 1

| Turning angle | Distance d [mm] from the center | | | | |
|---|---|---|---|---|---|
| α [°] | 200 | 250 | 300 | 350 | 400 |
| 4 | 21.3 | 18.3 | 16.8 | 18.2 | 21.5 |
| 8 | 17.4 | 14.6 | 13.6 | 14.7 | 17.8 |
| 12 | 13.5 | 11.5 | 10.4 | 11.2 | 13.3 |
| 16 | 10.8 | 8.3 | 7.2 | 8.1 | 10.6 |
| 20 | 12.8 | 11.0 | 9.9 | 10.5 | 12.7 |
| 24 | 16.9 | 14.4 | 13.0 | 14.1 | 16.7 |
| 28 | 21.0 | 17.7 | 16.1 | 17.4 | 20.8 |

From this result, a combination whereby the maximum value of the angle between a normal line to the glass surface and the axis of air-blowing opening is minimized, is selected. As a result, the turning angle α of each blade-shaped member was set to be 16°, the turning point E was determined as a point 300 mm sideways (vertical direction in FIG. 10) from the center of the glass sheet. Under these conditions, a cooling apparatus of this Example was prepared. The cooling conditions are as follows both in Example and Comparative Example.

Cooling Conditions:
    Upper blowing opening wind pressure: 15.6 kPa
    Lower blowing opening wind pressure: 15.4 kPa
    Blowing opening distance (distance from upper blowing member to upper surface of glass sheet/distance from lower blowing member to lower surface of glass sheet: 50 mm/50 mm

[Fragmentation Test]

The test was carried out according to "tempered glass fragmentation test" according to JIS R3212. Namely, a masking tape was pasted to cover the entire surface of one side of a glass sheet, and an impact was applied to a point substantially corresponding to the gravity center of the glass sheet from the other surface of the glass sheet, that was not pasted with the tape, to pulverize the glass sheet. The evaluation standard (criteria) was such that a sample wherein the number of particles is at least 40 in a 50 mm×50 mm square even in a region of the test area where the piece size is the largest.

[Results]

Five glass sheets air-cooled/tempered in each of Example and Comparative Example, were prepared, and the pulverization test was carried out. In the glass sheets air-cooled/tempered in Comparative Example, the number of particles was from 10 to 40 pieces in an upper end corner portion of each glass sheet where the size of the pieces was the largest. On the other hand, in the glass sheets air-cooled/tempered in Example, the number of particles was from 60 to 150 pieces in an upper end corner portion of the glass sheet where the size of the pieces was the largest.

Further, an example of the results is shown below. In each of four corners of each glass sheet, that are regions M1, M2, M3 and M4 shown in FIG. 10, the number of particles in a 50 mm×50 mm square was measured. This result indicates that improvement was made in upper two corners.

TABLE 2

| Measurement area | Example (pcs) | Comp. Ex. (pcs) |
|---|---|---|
| M1 | 147 | 29 |
| M2 | 87 | 71 |
| M3 | 74 | 100 |
| M4 | 109 | 39 |

Figure 12:
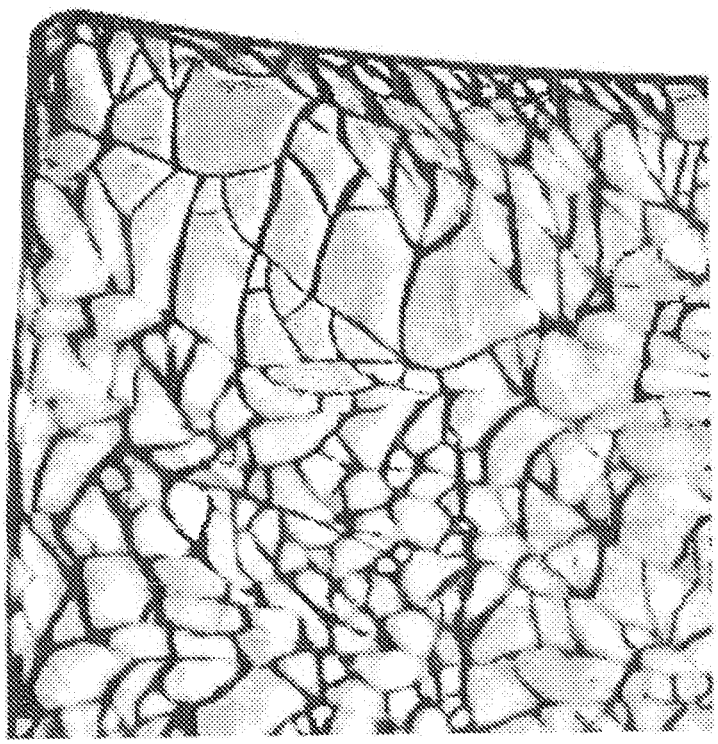
FIG. 12 is a photograph showing fragmentation of a glass sheet.
Figure 13:
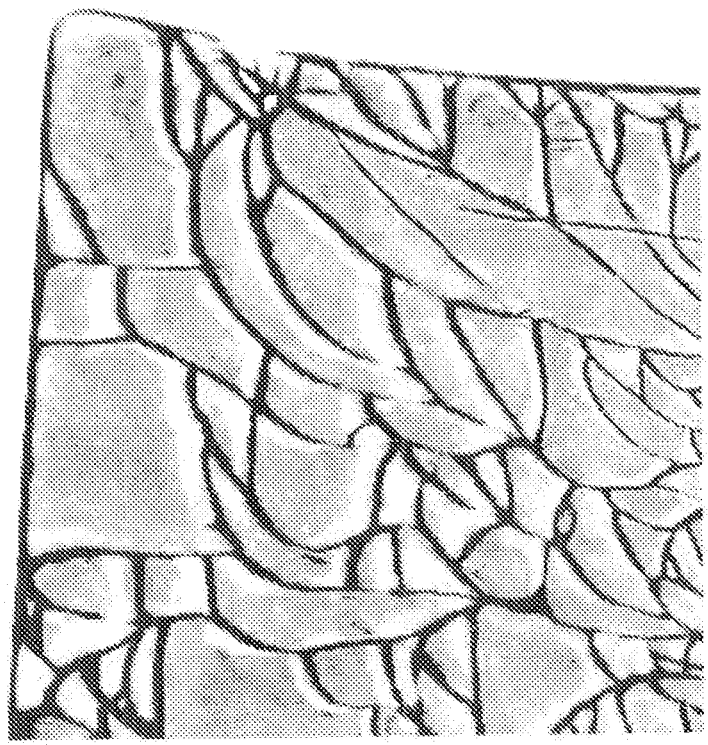
FIG. 13 is a photograph showing fragmentation of a glass sheet.

Further, FIGS. 12 and 13 show fragmentation in region M1 of a glass sheet. FIG. 12 shows a fragmentation in Example, and FIG. 13 shows a fragmentation in Comparative Example. It is apparent from these fragmentation that improvement has been made in Example.

Accordingly, it has been proved that the air-cooling/tempering apparatus of the present invention can properly temper even corner portions of a glass sheet where the size of particles is the largest, and accordingly, a significant improvement in tempering was recognized. Here, with conventional air-cooling/tempering apparatuses, since the number of particles does not satisfy the evaluation criteria, it is necessary to improve tempering by e.g. increasing the heating temperature of glass sheets.

INDUSTRIAL APPLICABILITY

The present invention is applicable to air-cooling/tempering of glass sheets, particularly to air-cooling/tempering of automotive window glasses or vehicle window glasses having a complexly curved shape.

The entire disclosure of Japanese Patent Application No. 2008-231039 filed on Sep. 9, 2008 including specification, claims, drawings and summary is incorporated herein by reference in its entirety.

REFERENCE SYMBOLS

G: Glass sheet, 1: upper blowing member, 2: lower blowing member, 3: blade-shaped member, 4: air-blowing opening, 5: complexly curved surface, 10: air-cooling/tempering apparatus, 12: glass sheet forming apparatus, 14: heating unit, 16: roller conveyer, 18: heating unit 14 forming unit 20: roller conveyer, 24: forming mold, 25: suction pipe, 26: bending ring, 27: bending ring-supporting frame, 28: bending shuttle, 29: rail, 30: upper blowing member, 32: lower blowing member, 34: duct, 36: blade-shaped member, 38: blade-shaped member, 40: air-blowing opening, 42: cylindrical nozzle, 44: air-blowing opening, 46: nozzle block, 48: guide opening, 50: cooling air flow path, 52: guide face, 60: quench shuttle, 62: rail, 64: quench ring-supporting frame, 66: quench ring

What is claimed is:

1. An air-cooling/tempering apparatus for a glass sheet which is in a state of high temperature and bent to have a complexly curved surface wherein the glass is curved from a horizontal plane along a first direction and also along a second direction which is perpendicular to the first direction, comprising:

an upper blowing member for blowing a cooling air against an upper surface of a glass sheet in said state of high temperature and bent to have a complexly curved surface; and a lower blowing member for blowing a cooling air against a lower surface of a glass sheet in said state of high temperature and bent to have a complexly curved surface, wherein:

the upper blowing member and the lower blowing member each having a plurality of nozzle chambers arranged in parallel with one another with a gap between adjacent nozzle chambers, and each nozzle chamber is provided with a plurality of air-blowing openings facing to the glass sheet to form an end face for each of the upper and lower blowing members, respectively, the end face of the lower blowing member has a curved shape configured to be substantially perpendicular to the complexly curved surface, and each of the plurality of nozzle chambers has a central portion which extends along a first direction, and a side portion which extends along a second direction that is angled with respect to the first direction in plan view.

2. The air-cooling/tempering apparatus for a glass sheet according to claim 1, wherein:

each of the nozzle chambers is a blade-shaped member.

3. The air-cooling/tempering apparatus for a glass sheet according to claim 1, wherein each of the nozzle chambers is provided with a guide flow path for guiding air to each air-blowing opening, and the guide flow path is formed so that an axis of the guide flow path is perpendicular to a surface of a glass sheet to be air-cooled/tempered.

4. The air-cooling/tempering apparatus for a glass sheet according to claim 3, wherein a length of the guide flow path is at least 100 mm.

5. The air-cooling/tempering apparatus for a glass sheet according to claim 1, wherein:

each nozzle chamber has a plurality of cylindrical nozzles arranged linearly.

6. The air-cooling/tempering apparatus for a glass sheet according to claim 1, wherein the arrangement of the air-blowing openings is angled from the first direction to the second direction at an air-blowing opening having a location which corresponds to a first position where an upper end line or a lower end line of the glass sheet, extending from a central portion of the glass sheet, deeply curves upwardly or downwardly.

7. The air-cooling/tempering apparatus for a glass sheet according to claim 6, wherein the arrangement of the air-blowing openings is angled from the first direction to a third direction at an air-blowing opening having a location which corresponds to a second position of where the upper end line or the lower end line of the glass sheet extending from the central portion of the glass sheet deeply curves upwardly or downwardly, said second position being different from the first position.

8. The air-cooling/tempering apparatus for a glass sheet according to claim 1, wherein the air-blowing openings arranged along the second direction are linearly arranged from an end point of the air-blowing openings arranged in the first direction toward an end of the arrangement.

* * * * *